US011076112B2

(12) United States Patent
Peterson et al.

(10) Patent No.: US 11,076,112 B2
(45) Date of Patent: Jul. 27, 2021

(54) SYSTEMS AND METHODS TO PRESENT CLOSED CAPTIONING USING AUGMENTED REALITY

(71) Applicant: Lenovo (Singapore) Pte. Ltd., New Tech Park (SG)

(72) Inventors: Nathan J. Peterson, Oxford, NC (US); Arnold S. Weksler, Raleigh, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 25 days.

(21) Appl. No.: 15/282,844

(22) Filed: Sep. 30, 2016

(65) Prior Publication Data

US 2018/0098002 A1 Apr. 5, 2018

(51) Int. Cl.
*H04N 11/00* (2006.01)
*H04N 5/278* (2006.01)
*G06T 19/00* (2011.01)
*G06T 11/60* (2006.01)
*G06T 11/00* (2006.01)

(52) U.S. Cl.
CPC .............. *H04N 5/278* (2013.01); *G06T 11/00* (2013.01); *G06T 11/60* (2013.01); *G06T 19/006* (2013.01)

(58) Field of Classification Search
CPC ......... H04N 2017/008; H04N 21/4221; H04N 5/278; H04N 21/4888; G06T 19/006; G06T 1/60
See application file for complete search history.

(56) References Cited

U.S. PATENT DOCUMENTS

| 5,648,789 | A  | * | 7/1997  | Beadles  | G02B 27/017 345/8 |
| 9,013,551 | B2 | * | 4/2015  | Zhang    | H04N 13/183 348/46 |
| 9,866,916 | B1 | * | 1/2018  | Boss     | H04N 21/41415 |
| 2002/0101537 | A1 | * | 8/2002  | Basson   | H04N 5/445 348/465 |
| 2011/0227911 | A1 | * | 9/2011  | Joo      | H04N 13/398 345/419 |
| 2012/0081363 | A1 | * | 4/2012  | Kang     | H04N 13/341 345/419 |
| 2012/0320155 | A1 | * | 12/2012 | Suh      | H04N 21/816 348/43 |
| 2013/0063578 | A1 | * | 3/2013  | Uesaka   | H04N 13/341 348/53 |
| 2013/0169762 | A1 | * | 7/2013  | Kanemaru | H04N 13/356 348/51 |

(Continued)

*Primary Examiner* — Paulos M Natnael
*Assistant Examiner* — Humam M Satti
(74) *Attorney, Agent, or Firm* — John M. Rogitz; John L. Rogitz (57) ABSTRACT

In one aspect, a headset includes a housing, a processor coupled to the housing, a first display coupled to the housing and accessible to the processor, and storage coupled to the housing and accessible to the processor. The storage bears instructions executable by the processor to identify a closed captioning setting, receive closed captioning data indicating closed captioning text at the headset, and present the closed captioning text in accordance with the closed captioning setting on the first display of the headset using augmented reality processing.

20 Claims, 6 Drawing Sheets

(56) References Cited

U.S. PATENT DOCUMENTS

| | | | |
|---|---|---|---|
| 2014/0015829 A1* | 1/2014 | Park | H04N 13/341 345/419 |
| 2014/0035951 A1* | 2/2014 | Martellaro | G09G 3/003 345/633 |
| 2014/0112506 A1* | 4/2014 | Hopkins | H04N 21/4852 381/306 |
| 2014/0240472 A1* | 8/2014 | Hamasaki | H04N 13/183 348/51 |
| 2014/0267245 A1* | 9/2014 | Tanger | G06T 7/596 345/419 |
| 2015/0042771 A1* | 2/2015 | Jensen | G06F 3/013 348/54 |
| 2015/0268547 A1* | 9/2015 | Miesak | G03B 21/26 353/36 |
| 2015/0373420 A1* | 12/2015 | Liu | H04N 21/4307 725/32 |
| 2015/0382064 A1* | 12/2015 | Aravamudan | H04N 21/4856 725/37 |
| 2016/0042494 A1* | 2/2016 | Baek | H04N 21/4312 348/468 |
| 2016/0231872 A1* | 8/2016 | Tamura | G06F 1/1694 |
| 2016/0323552 A1* | 11/2016 | Peterson | H04N 21/4223 |
| 2019/0163963 A1* | 5/2019 | Minnick | H04N 21/4223 |
| 2019/0385376 A1* | 12/2019 | Kim | G06F 3/04815 |

* cited by examiner

SYSTEMS AND METHODS TO PRESENT CLOSED CAPTIONING USING AUGMENTED REALITY

FIELD

The present application relates generally to systems and methods to present closed captioning using augmented reality.

BACKGROUND

As recognized herein, some people like to watch closed captioning while viewing corresponding video content, while others do not. Some may even need closed captioning to adequately consume audio video content if they have a hearing impairment. However, if two such people—one that likes to watch closed captioning and one that does not—wish to watch the same audio video content on a video display, either closed captioning may be presented on the video display or it may not, leading to one of the two people being dissatisfied.

SUMMARY

Accordingly, in one aspect a headset includes a housing, a processor coupled to the housing, a first display coupled to the housing and accessible to the processor, and storage coupled to the housing and accessible to the processor. The storage bears instructions executable by the processor to identify a closed captioning setting, receive closed captioning data indicating closed captioning text at the headset, and present the closed captioning text in accordance with the closed captioning setting on the first display of the headset using augmented reality processing.

In another aspect, a method includes identifying a setting pertaining to the presentation of closed captioning on an augmented reality (AR) headset and presenting, using a display of the AR headset, closed captioning in conformance with the setting.

In still another aspect, an apparatus includes a first processor, a network adapter, and storage. The storage bears instructions executable by a second processor for communicating with a device to present, using augmented reality (AR) processing, closed captioning text per at least one user preference. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Disclosed herein are systems and methods to use augmented reality (AR) processing, software, algorithms, etc. to allow a user to specify his or her own closed captioning/subtitle preferences, or the lack thereof. For example, if one user is taking a Spanish class and wants to watch closed captioning for a particular program in Spanish even if the corresponding audio for the program is in English, that user may use his or her AR headset to do so while others may watch the same program on the same TV without being bothered by the Spanish closed captioning. Another user may have a hearing impairment and may view closed captioning in English using his or her AR headset while watching the same program on the TV. Yet a third user may not want to view closed captioning at all, and accordingly may simply watch the program without an AR headset or may watch the program through his or her AR headset but without any closed captioning being presented using that AR headset.

Accordingly, it is to be understood that the appropriate closed captioning data for a given user may be streamed to that user's AR headset individually, e.g., from the TV itself, from a console communicating with the AR headset for AR processing, from an Internet server, etc. In some embodiments, an AR headset may even detect the particular user that is wearing the headset and apply his or her closed captioning preferences, such as responsive to the headset being put on, responsive to movement of the headset as identified from a motion sensor, etc. Additionally or alternatively, the user may be identified based on user input.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

Figure 1:
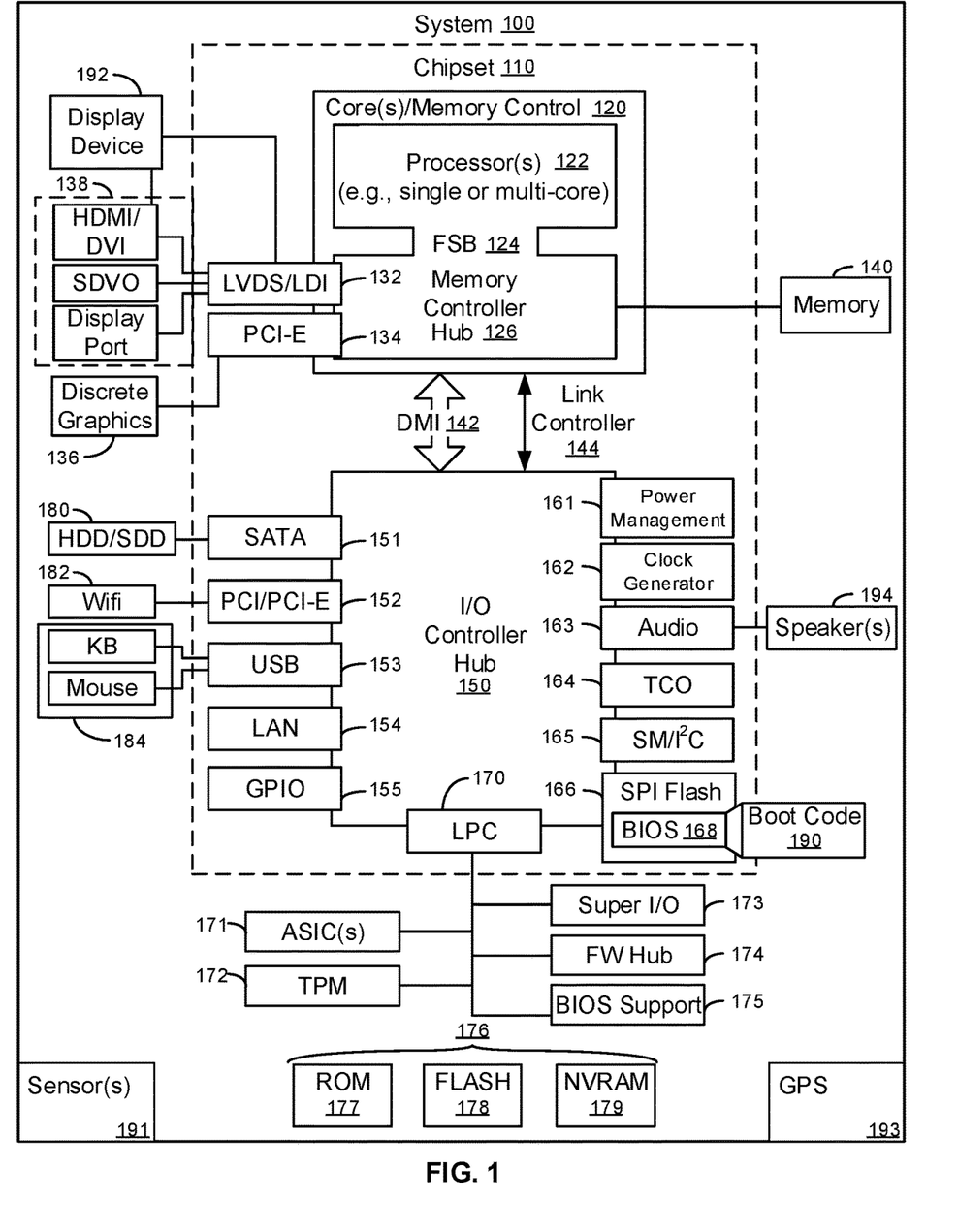
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors 191 from which input may be received for the system 100 to identify a particular user in accordance with present principles. For example, the sensor 191 may be an audio receiver/microphone that provides input from the microphone to the processor 122 based on audio that is detected, such as via a user providing audible input to the microphone, so that the user may be identified based on voice identification. As another example, the sensor 191 may be a camera that gathers one or more images and provides input related thereto to the processor 122 so that the user may be identified based on facial recognition or other biometric recognition. The camera may be a thermal imaging camera, a digital camera such as a webcam, a three-dimensional (3D) camera, and/or a camera otherwise integrated into the system 100 and controllable by the processor 122 to gather pictures/images and/or video. The sensor 191 may also be, for instance, another kind of biometric sensor for use for such purposes, such as a fingerprint reader, a pulse monitor, a heat sensor, etc.

The sensor 191 may even be a motion sensor such as a gyroscope that senses and/or measures the orientation of the system 100 and provides input related thereto to the processor 122, and/or an accelerometer that senses acceleration and/or movement of the system 100 and provides input related thereto to the processor 122. Thus, unique and/or particular motion or motion patterns may be identified to identify a user as being associated with those motions/patterns in accordance with present principles.

Additionally, the system 100 may include a GPS transceiver 193 that is configured to receive geographic position information from at least one satellite and provide the information to the processor 122. However, it is to be understood that another suitable position receiver other than a GPS receiver may be used in accordance with present principles to determine the location of the system 100. In some embodiments, the GPS transceiver 193 may even establish a sensor for use in accordance with present principles to identify a particular user based on the user being associated with a particular location (e.g., a particular building, a particular location within a room of a personal residence, etc.)

It is to be understood that an example client device or other machine/computer may include fewer or more features than shown on the system 100 of FIG. 1. In any case, it is to be understood at least based on the foregoing that the system 100 is configured to undertake present principles.

Figure 2:
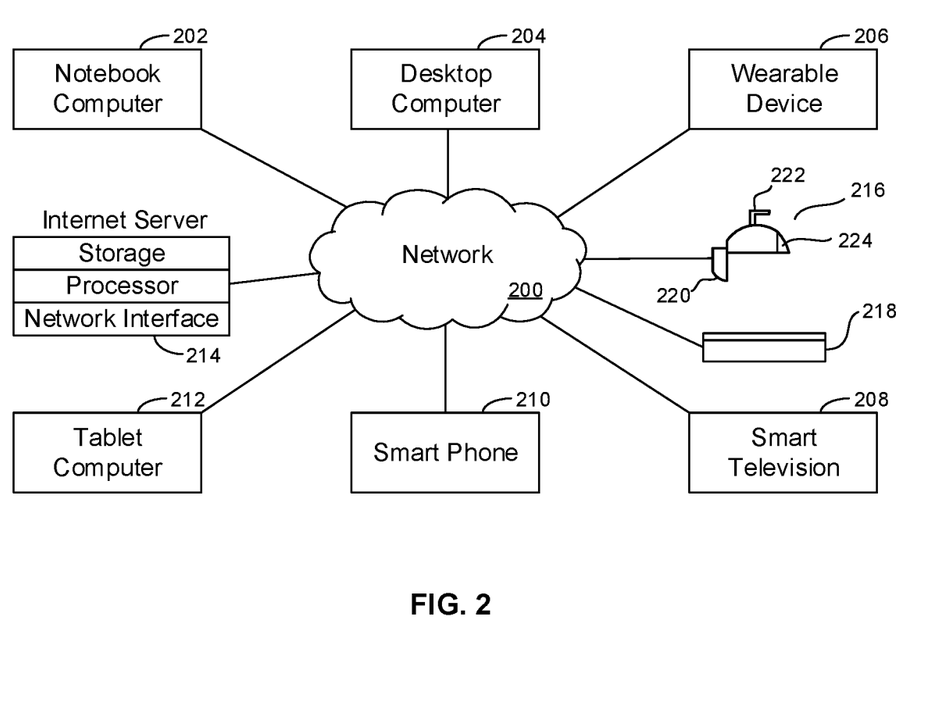
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, a console 218, and a server 214 such as an Internet server that may provide cloud storage accessible to the devices 202-212, 216, and 218. It is to be understood that the devices 202-218 are configured to communicate with each other over the network 200 to undertake present principles.

Describing the headset 216 in more detail, it may include a housing to which a display device 220 is coupled for presenting virtual reality (VR) and/or augmented reality (AR) content. The display device 220 may include an at least partially transparent display through which a wearer of the headset may view real-world objects and on which the headset 216 may present virtual reality and/or augmented reality objects/images. The headset 216 may also include one or more head-engagement members 222 for a user to dispose the headset 216 on his or her head. The headset 216 may also include a communication and/or network interface 224 for wired and/or wireless communication with the other devices of FIG. 2 such as via the Internet, a local area network (LAN), a Bluetooth network, etc.

Describing the console 218 in more detail, it may be a virtual reality and/or augmented reality console for use in conjunction with the headset 216. Thus, the console 218 may operate in conjunction with the headset 216 for augmented reality processing and the undertaking the computer-implemented steps, instructions, and functions described herein. Though not shown for clarity, it is to be understood that the console 218 may also include a network interface for wired and/or wireless communication with the other devices of FIG. 2 such as via the Internet, a local area network (LAN), a Bluetooth network, etc.

FIGS. 3-6 show example illustrations of a user's perspective while wearing an augmented reality (AR) headset in accordance with present principles. Thus, it is to be understood that the perspectives shown in these figures are views a user would have when wearing an AR headset upright and looking through an at least partially transparent AR display 300 for the headset. The user, when viewing his or her environment through the AR display 300 of his or her respective AR headset, may see a television (TV) 302 presenting audio video content 304, as well as other real-world objects within his or her field of view such as a clock 306 and a footstool 308 disposed on a floor 310 of a room in which the user is disposed.

Figure 3:
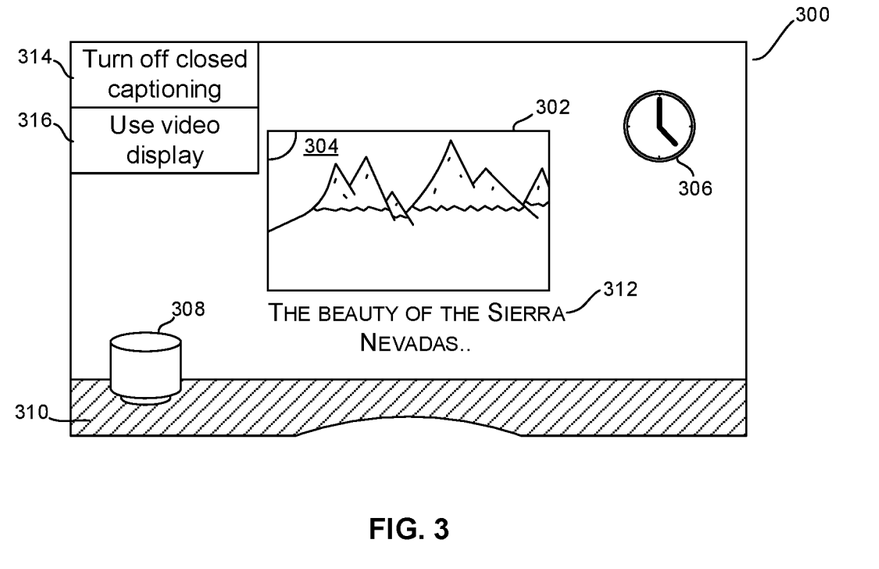
FIGS. 3-6 show perspectives of a user viewing an environment through an at least partially transparent display in accordance with present principles.

FIG. 3 shows that, per one user setting/preference, closed captioning (CC) text 312 is presented on and using the AR display 300 using AR processing so that the text appears outside the boundaries of the TV 302 that is presenting the audio video content 304 associated with the CC text 312.

Further, even though it is presented outside the boundaries, the CC text 312 may be presented using augmented reality such that it appears to be adjacent to the TV 302 and coplanar with a plane established by the front of the TV 302 on which the content 304 is presented. Per user preference, the text 312 may even be presented in one color or another based on a user specifying as much, such as being presented in blue color or being presented in green color.

Also per user preference and as may be appreciated from FIG. 3, the text 312 may be presented below the TV 312 such that at least a top line of the text 312 appears, e.g., a threshold distance away from the lower boundary of the TV 302. However, note that the user may provide preference input for CC text to be presented at other locations outside the boundaries of the TV 302 as well, such as above the upper boundary of the TV 302, to the left of the left boundary of the TV 302, or to the right of the right boundary of the TV 302.

Still in reference to FIG. 3, note that selectors 314, 316 may also be presented on and using the AR display 300. Each of the selectors 314, 316 may be selectable by a user, such as by staring at the selector for at least a threshold amount of time. Staring may be identified by the AR headset using images received from a camera on the AR headset that images the user to then execute eye tracking software on the images to identify the stare at the respective selector. Voice commands to select a given selector may also be used, as may be identified based on input from a microphone and execution of voice recognition software on the input.

The selector 314 may be selected to turn off presentation of CC text. The selector 316 may be selected to transmit a command from the AR headset to the TV 302 for the TV 302 to instead present the CC text thereon instead of presenting CC text using the AR display 300.

Figure 4:
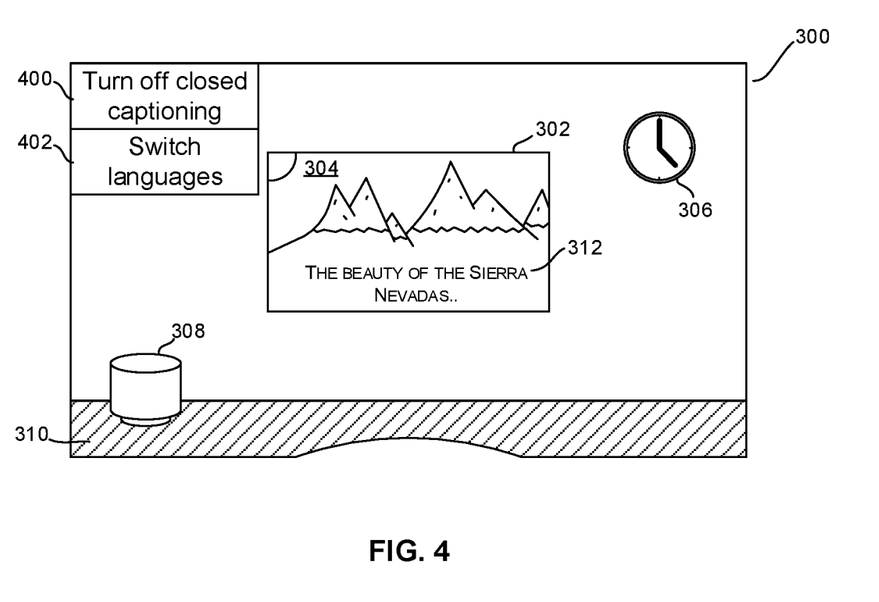

Turning to FIG. 4, it shows that, per another setting/preference, the CC text 312 is presented on and using the AR display 300 using AR processing so that the text appears inside the boundaries of the TV 302 and overlaid on a portion of the content 304 relative to the user wearing the AR headset upright and viewing the environment through the display 300.

Selectors 400, 402 are also shown in FIG. 4. The selectors 400, 402 may be presented on and using the AR display 300. Each of the selectors 400, 402 may be selectable by a user similar to as set forth above. The selector 400 may be selected to turn off presentation of CC text. The selector 402 may be selected to switch languages in which CC text is being presented using the AR display 300, such as switching from English to Spanish or to another language per a user preference. For example, the selector 402 may be selected to switch between a default language for CC text as received from a content provider and a language preferred by the user as specified by the user. Thus, it is to be understood that in some embodiments the selector 402 may be selected for the AR headset to transmit a command to a CC source for the CC source to stream CC text to the AR headset in the switched-to language, while in other embodiments the AR headset may itself seek out and access (e.g., via the Internet) the appropriate CC text for the switched-to language so that it may be presented on the AR display 300.

Also, note that a selector similar to the selector 316 may also be presented in the example shown in FIG. 4, though not actually shown for simplicity. Similarly, it is to also be understood that the selector 402 may be presented in the example shown in FIG. 3, though not actually shown for simplicity.

Figure 5:
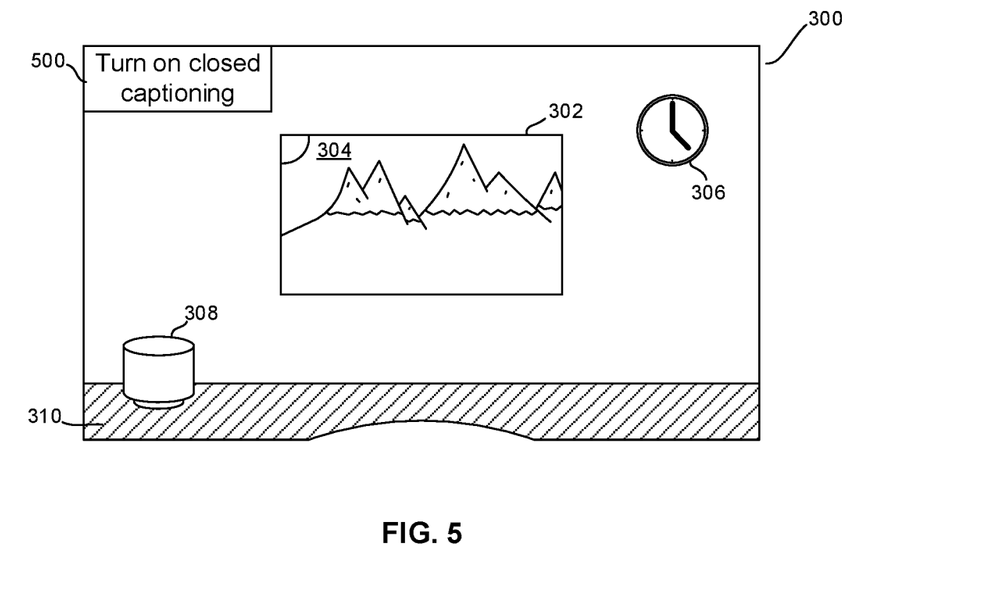

FIG. 5 shows an example in which, per a setting/preference, no CC text is being presented using the AR display 300 while a user observes the content 304 on the TV 302 through the AR display 300. However, note that a selector 500 may be presented on and using the AR display 300, with the selector 500 being selectable to command the AR headset to begin presenting CC text corresponding to the content 304 using the AR display 302 per one or more user preferences, such as to begin presenting CC text in Chinese and presenting the CC text outside the boundaries of the TV 302. Then, responsive to the AR device beginning to present CC text and while presenting the CC text, the AR device may also present selectors such as the selectors 314, 315, and 402 discussed above.

Figure 6:
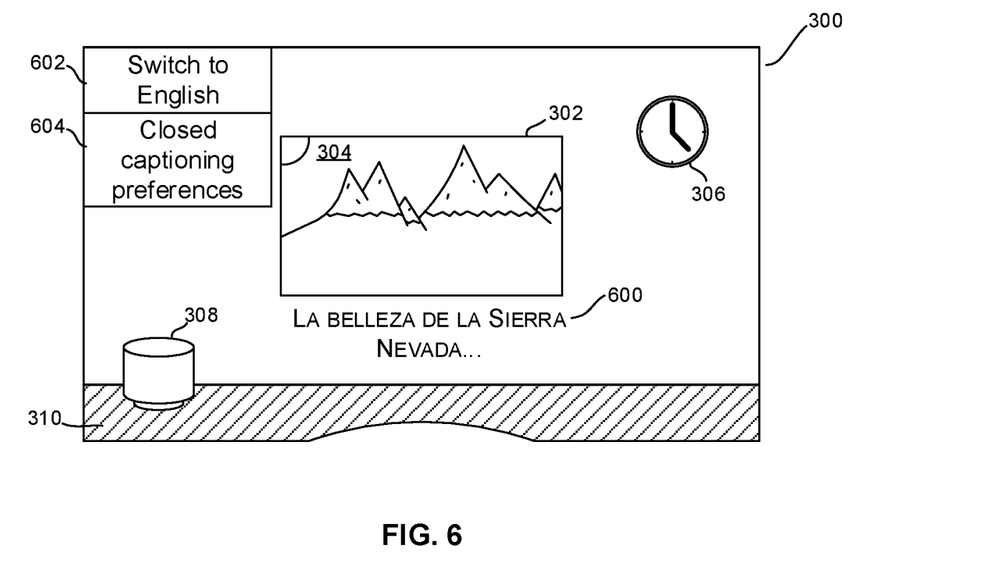

FIG. 6 shows an example in which, per a setting/preference, Spanish CC text 600 is being presented using the AR display 300 while a user observes the content 304 on the TV 302 through the AR display 300, with the content 304 understood to include English-based audio to accompany the video portion of the content shown on the TV 302. A selector 602 is also shown that is selectable to command the AR headset to switch from presentation of CC text in Spanish using the AR display 300 to presentation of CC text in English using the AR display 300.

A selector 604 is also shown that is selectable to command the AR headset to present a user interface (UI) for a user to configure one or more settings/preferences in accordance with present principles, such as to present the UI 800 of FIG. 8 to be described below. A selector similar to the selector 604 may also be presented in the examples disclosed above in reference to FIGS. 3-5, though not actually shown for simplicity.

Figure 7:
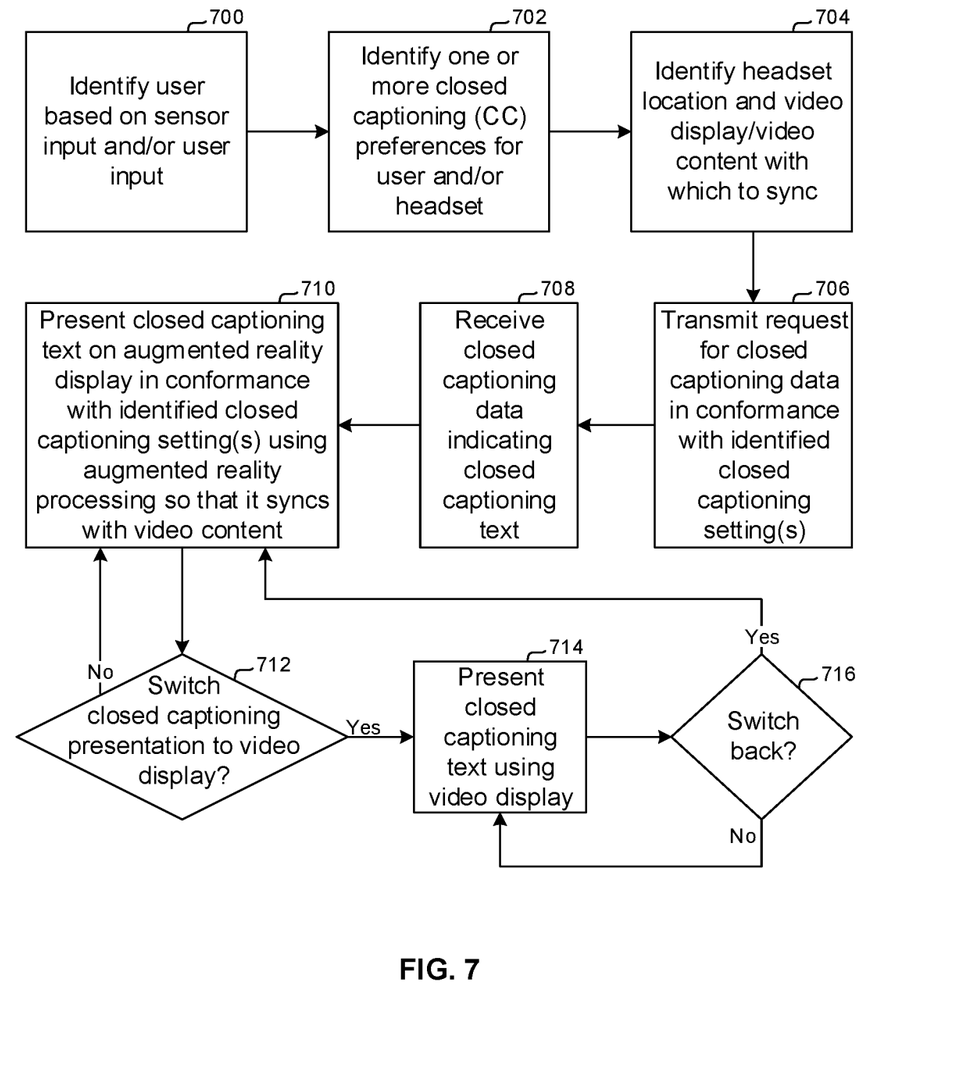
FIG. 7 is a flow chart of an example algorithm in accordance with present principles.

Referring now to FIG. 7, it shows example logic that may be executed by a device such as the system 100, an AR headset such as the headset 216, a console such as the console 218 operating in conjunction with an AR headset, etc. for presenting CC text using AR processing in accordance with present principles. For convenience, the device undertaking the logic of FIG. 7 will be referred to as a headset, and indeed in at least one embodiment the logic described below may be executed in whole or in part by the headset.

The logic of FIG. 7 begins at block 700 where it identifies a user based on sensor input and/or user input in accordance with present principles, such as using one of the ways described above when describing the sensor(s) 191. From block 300 the logic may next move to block 702, where responsive to identifying the user the logic may identify one or more closed captioning settings/preferences for the user and/or for the headset itself.

The logic may next move to block 704 where the logic may identify a location of the headset, such as using a GPS transceiver on the headset. Also at block 704, the logic may identify a video display operating at the location and/or associated with the location, such as a TV. At block 704 the logic may also identify audio video content being presented at that location with which presentation of CC content using the headset is to synchronize. The logic may identify the video display and/or content, for instance, by wirelessly communicating with the TV to exchange location information and content information.

From block 704 the logic may then proceed to block 706. At block 706 the logic may use the headset's communication interface to transmit a request from the headset to a CC text source for CC data indicating CC text that is associated with the identified content and that is to be presented using the headset's display in conformance with the one or more settings/preferences identified at block 702. For example, at block 706 the logic may transmit a request to a content provider for transmission of CC data to the headset indicating Spanish CC text that is associated with the content identified at block 704. Then, at block 708, the logic may receive back CC data in response to the request that indicates CC text (e.g., in Spanish) to be presented using the headset's display.

From block 708 the logic may move to block 710. At block 710 the logic may present the CC text on the headset's display in conformance with one or more of the settings/preferences identified at block 702, such as a setting pertaining to a language in which the CC text is to be presented and a setting pertaining to a location relative to the TV at which the CC text is to appear to be presented (e.g., outside the boundaries of the TV). The logic may do so using AR processing, software, algorithms, etc.

Furthermore, it is to be understood that the CC text may be presented at block 710 using the headset's display so that the CC text synchronizes with the audio video content being presented on the TV. For example, a first portion of CC text may be synchronized so that it is presented concurrently with first audio of the content corresponding to the first potion of CC text, and then a second portion of CC text may be synchronized so that it is subsequently presented using the TV while second audio for the same content is concurrently presented using the TV that corresponds to the second portion of the CC text.

From block 710 the logic may proceed to decision diamond 712. At diamond 712 the logic may determine whether to switch from presentation of the CC text using the headset's display to presentation of the CC text using the TV instead. The determination at diamond 712 may be made, for example, based on user input regarding such a switch. As another example, the determination at diamond 712 may also be made based on the length of the CC text itself that is to be presented at any given time and/or a type of scene currently being presented on the TV as part of the audio video content, as will be described further below.

A negative determination at diamond 712 causes the logic of FIG. 7 to revert back to block 710 and proceed therefrom. However, an affirmative determination at diamond 712 instead causes the logic to proceed to block 714. At block 714 the logic may transmit a command to the TV for the CC text to be presented using the TV's display instead of the headset's display, and/or may control the TV display itself for the CC text to be presented using the TV's display.

From block 714 the logic may move to decision diamond 716. At diamond 716 the logic may determine whether it should switch back presentation of the CC text from the TV's display to the headset's display, such as based on user input, based on the length of the CC text, and/or based on scene type. A negative determination at diamond 716 may cause the logic to revert back to block 714, while an affirmative determination at diamond 716 may cause the logic to revert back to block 710 to present CC text using the AR display.

Describing the aforementioned CC length on which the determinations above may be based, it is to be understood that, at any given time, more or less CC text may be presented than at another time. For example, a given portion of the audio video content may contain a lot of talking and thus corresponding CC text to be presented for that portion may be relatively more voluminous than CC text for another portion of the same audio video content that contains relatively less talking.

Thus, when, for instance, CC text to be presented concurrently at a given time is lower than a threshold amount, the CC text may be presented using the TV's display. Then, when other CC text more than the threshold amount is to be concurrently presented, presentation of the CC text may switch so that it is presented using the headset's display so that it appears outside the boundaries of the TV when viewing the TV through the headset's display so that the video portion of the content on the TV is not unduly obstructed from view as would be the case if the CC text were presented on the TV. The threshold amount may be a threshold number of characters, a threshold number of sentences, a threshold CC length, a threshold number of CC lines as presented to the user, etc.

Switching presentation of CC text between the TV and headset's display may also be based on scene type. For instance, if a given piece of audio video content has both action scenes and monologue scenes (e.g., with each being tagged for its respective scene type using metadata accessible to the headset), CC text for the action scenes may be presented using the headset's display so that it appears outside the boundaries of the TV so that the user may fully appreciate the action scene unobstructed by CC text, while CC text corresponding to the monologue scenes may be presented using the TV.

In addition to the foregoing, presentation of CC text may also be switched based on headset location, even if the CC text is to always be presented using the headset's display per a user setting/preference. For instance, if the user is in a first room of his or her personal residence and is observing audio video content presented on a first TV in the first room, the headset may identify that location and communicate with the first TV to present CC text on the headset's display that corresponds to the content presented on the first TV. If the user were to then move to a second room in the personal residence in which a second TV is disposed that is presenting a different piece of audio video content, the headset may identify the change in location and communicate with the second TV to present CC text on the headset's display that corresponds to the content presented on the second TV. However, the user may also provide input of settings/preferences to, instead of switching presentation of CC text as described above, either stop presenting CC text using the headset display responsive to a change in location or continue presenting CC text corresponding to the first TV's audio video content notwithstanding the change in location to the second room.

Figure 8:
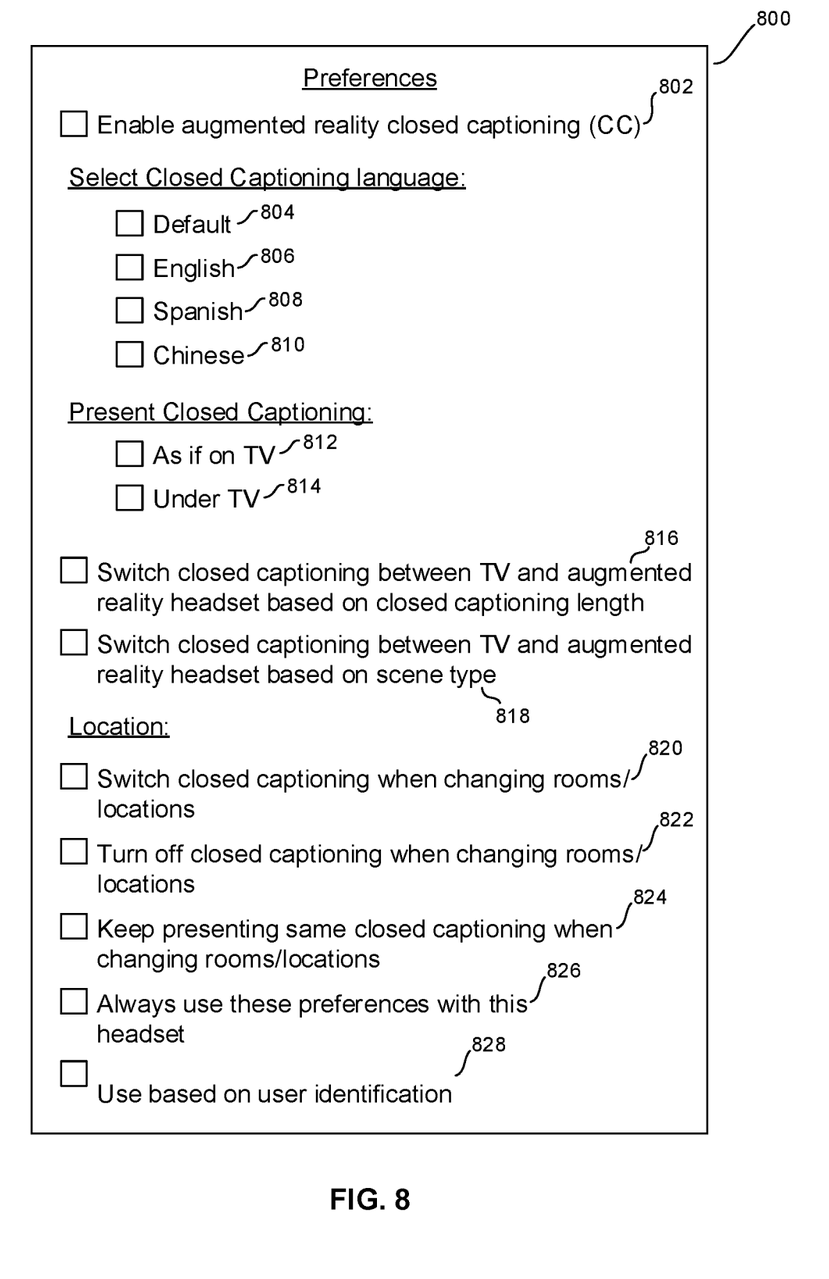
FIG. 8 is an example user interface (UI) in accordance with present principles.

Continuing the detailed description in reference to FIG. 8, it shows an example user interface (UI) 800 presentable on a display for configuring user settings/preferences in accordance with present principles. For instance, the UI 800 may be presented on a display of an AR headset, or a display of a smart phone in communication with the AR headset, or on a TV in communication with the AR headset. It is to be understood that each of the settings/preferences that will be discussed below may be selected using the respective check box shown adjacent to each one on the UI 800.

A first setting 802 is shown that is selectable to enable presentation of CC text using a display of an AR headset in accordance with present principles. For example, the first setting 802 may be selected to configure the user's headset to undertake the logic of FIG. 7.

The UI 800 may also include settings 804, 806, 808, and 810 that are selectable to present CC text in various respective languages in accordance with present principles, such as in a default language that is the same language of a given piece of content synchronized with the CC text (setting 804).

Setting 806 may be selected to provide input of a user preference to present CC text in English, setting 808 may be selected to provide input of a user preference to present CC text in Spanish, and setting 810 may be selected to provide input of a user preference to present CC text in Chinese. Still other languages may be specified by a user, though only the foregoing are shown for simplicity.

Still further, the UI 800 of FIG. 8 may include settings 812, 814 that are selectable to present CC text using an AR headset display as if overlaid on another display on which corresponding video content is being presented (setting 812) or to present CC text using the AR headset display so that the CC text appears outside the boundaries of the other display (setting 814).

Additionally, the UI 800 may include a setting 816 that is selectable to configure a user preference for switching presentation of CC text between the AR headset display and another display presenting corresponding video content based on CC text length as set forth herein. The UI 800 may further include a setting 818 that is selectable to configure a user preference for switching presentation of CC text between the AR headset display and another display presenting corresponding video content based on scene type as set forth herein.

Settings for presentation of CC text based on location may also be configured using the UI 800. Thus, a setting 820 is shown on the UI 800 that is selectable to switch presentation of CC text based on a change in headset location as set forth herein. Another setting 822 is shown that is selectable to turn off presentation of CC text based on a change in headset location away from a location at which another display was presenting corresponding video content for the CC text as set forth herein. Still further, yet another setting 824 may be presented on the UI 800 that is selectable to continue presenting CC text corresponding to a given piece of content notwithstanding a change in headset location (e.g., away from a location of a display on which corresponding video content is being presented) as set forth herein.

Still in reference to FIG. 8, in some embodiments the UI 800 may include still other settings/preferences that may be configured by a user via the UI 800. For instance, the UI 800 may include a setting 826 that is selectable to apply the other settings discussed above for use with the headset regardless of which user may be wearing the headset at a given time, while a setting 828 may be presented that is selectable to apply the other settings discussed above only for a particular user that is identified as wearing the headset at a given time and to apply different settings/preferences for a different user when that different user is identified as wearing the same headset.

It may now be appreciated that present principles provide for rendering closed captioning and/or subtitle text using an at least partially transparent display of a headset so that the closed captioning appears overlaid on or adjacent to another display being viewed through the transparent display, per one or more user preferences. This may be done using three dimensional (3D) graphics rendering algorithms and/or processing, virtual reality graphics rendering algorithms and/or processing, augmented reality graphics rendering algorithms and/or processing, etc. The preferences of the user may be stored at the headset itself or another location accessible to the headset.

Furthermore, in some embodiments audio for AV content may be streamed individually to an AR headset if, for example, two people are watching the AV content through the displays of their respective AR headsets as the video for the AV content is presented on a TV. The audio that is streamed to each user's AR headset may be audio for the AV content that is received from the content's provider and that is in the same language as a language in which closed captioning is being presented to the user per a user's preference in accordance with present principles. Thus, even if primary audio for the AV content is in English, if one user wishes to not only see closed captioning for the AV content in Spanish using their AR headset but also wishes to hear audio for the AV content in Spanish, they may do so since Spanish audio may be requested by and streamed to their AR headset so that the person can listen to the Spanish audio through a speaker on his or her AR headset while reading the Spanish closed captioning. Meanwhile, the other user may listen to English audio for the AV content using his or her own respective AR headset.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
   a housing;
   at least one processor coupled to the housing;
   a first display coupled to the housing and accessible to the at least one processor; and
   storage coupled to the housing and accessible to the at least one processor, the storage bearing instructions executable by the at least one processor to:
   identify a closed captioning setting;
   receive, at the headset, closed captioning data indicating closed captioning text;
   present, on the first display of the headset and using augmented reality processing, closed captioning text in accordance with the closed captioning setting so that closed captioning text is presented on the first display to appear, from the perspective of a user that is wearing the headset upright, outside the boundaries of a second display on which video content is presented, closed captioning text also being presented on the first display to appear, from the perspective of the user wearing the headset upright, coplanar with a plane established by the front of the second display, the first display being different from the second display; and
   present, on the first display of the headset, a selector that is selectable to transmit a command from the headset to a device that controls the second display for the device to use the second display to present closed captioning text on the second display, the device being different from the headset, the selector showing text indicating that selection of the selector will provide a command to use the second display to present closed captioning text on the second display.

2. The headset of claim 1, comprising a camera, wherein the closed captioning setting is associated with a particular user, and wherein the instructions are executable by the at least one processor to:
identify the particular user based on input from the camera; and
identify the closed captioning setting based on the identification of the particular user.

3. A method, comprising:
identifying a setting pertaining to the presentation of closed captioning on an augmented reality (AR) headset;
presenting, using a first display of the AR headset, closed captioning for a first piece of video content that is presented on a second display that is not part of the AR headset; and
presenting, on the first display of the AR headset, a selector that is selectable to transmit a command from the headset to a device that controls the second display for the device to use the second display to present closed captioning on the second display, the device being different from the AR headset, the selector presenting alphabetical text indicating that selection of the selector will provide a command to use the second display to present closed captioning on the second display.

4. A computer readable storage medium (CRSM) that is not a transitory signal, the computer readable storage medium comprising instructions executable by at least one processor to:
present, using a first display of a headset, closed captioning text so that closed captioning text is presented to appear, from the perspective of a user that is wearing the headset upright, coplanar with a plane established by the front of a second display, the first display being different from the second display; and
present, on the first display of the headset, a selector that is selectable to command the headset to stop presenting closed captioning text on the first display and to transmit a command from the headset to a device that controls the second display for the device to use the second display to present closed captioning text on the second display, the device being different from the headset, the selector presenting text indicating that selection of the selector will provide a command to use the second display to present closed captioning text on the second display.

5. The headset of claim 1, wherein the closed captioning text is presented in a particular color specified by the user.

6. The headset of claim 1, wherein the closed captioning text is presented below the second display such that a top line of the closed captioning text appears a threshold distance away from the lower boundary of the second display.

7. The headset of claim 2, wherein the instructions are executable by the at least one processor to:
identify the particular user based on the input from the camera and execution of facial recognition.

8. The headset of claim 1, comprising a microphone, wherein the closed captioning setting is associated with a particular user, and wherein the instructions are executable by the at least one processor to:
identify the particular user based on input from the microphone and execution of voice identification; and
identify the closed captioning setting based on the identification of the particular user.

9. The headset of claim 1, comprising a fingerprint reader, wherein the closed captioning setting is associated with a particular user, and wherein the instructions are executable by the at least one processor to:
identify the particular user based on input from the fingerprint reader; and
identify the closed captioning setting based on the identification of the particular user.

10. The headset of claim 1, comprising one or more of a gyroscope and an accelerometer, wherein the closed captioning setting is associated with a particular user, and wherein the instructions are executable by the at least one processor to:
identify the particular user based on input from one or more of the gyroscope and accelerometer; and
identify the closed captioning setting based on the identification of the particular user.

11. The headset of claim 1, comprising a global positioning system (GPS) transceiver, wherein the closed captioning setting is associated with a particular user, and wherein the instructions are executable by the at least one processor to:
identify the particular user based on input from the GPS transceiver; and
identify the closed captioning setting based on the identification of the particular user.

12. The method of claim 3, comprising:
presenting, using the first display, closed captioning for the first piece of video content responsive to input from a motion sensor on the AR headset.

13. The headset of claim 1, wherein the selector is selectable based on staring at the selector for at least a threshold amount of time.

14. The headset of claim 1, wherein the selector is selectable based on a voice command.

15. The headset of claim 1, wherein the closed captioning text is presented to appear coplanar with the plane established by the front of the second display based at least in part on a user preference to present the closed captioning text to appear outside the boundaries of the second display and coplanar with the plane established by the front of the second display, input of the user preference being received prior to the presentation of the closed captioning text.

16. The method of claim 3, wherein the selector is selectable based on staring at the selector for at least a threshold amount of time.

17. The method of claim 3, wherein the selector is selectable based on a voice command.

18. The CRSM of claim 4, wherein the selector is selectable based on staring at the selector for at least a threshold amount of time.

19. The CRSM of claim 4, wherein the selector is selectable based on a voice command.

20. The CRSM of claim 4, wherein closed captioning text is presented in conformance with at least one setting pertaining to the presentation of closed captioning, and wherein the at least one setting specifies a length of a portion of closed captioning text to be concurrently presented.

* * * * *